United States Patent [19]
Ando

[11] Patent Number: 5,624,335
[45] Date of Patent: Apr. 29, 1997

[54] REAR DERAILLEUR FOR A BICYCLE

[75] Inventor: Yoshiaki Ando, Kawachinagano, Japan

[73] Assignee: Shimano, Inc., Osaka, Japan

[21] Appl. No.: 597,537

[22] Filed: Feb. 2, 1996

Related U.S. Application Data

[63] Continuation of Ser. No. 334,591, Nov. 3, 1994, abandoned.

[30] Foreign Application Priority Data

Nov. 12, 1993 [JP] Japan .................. 5-060910 U

[51] Int. Cl.$^6$ ........................................ F16H 9/06
[52] U.S. Cl. ............................................. 474/80
[58] Field of Search ............................ 474/78–82

[56] References Cited

U.S. PATENT DOCUMENTS

| | | | |
|---|---|---|---|
| 3,910,136 | 10/1975 | Juy | 474/82 X |
| 4,027,542 | 6/1977 | Nagano | 474/82 |
| 4,061,048 | 12/1977 | Huret et al. | 474/82 |
| 4,183,255 | 1/1980 | Leiter | 474/82 |
| 4,241,617 | 12/1980 | Nagano et al. | 474/82 |
| 4,362,522 | 12/1982 | Huret | 474/82 |
| 4,362,523 | 12/1982 | Huret | 474/82 |
| 4,403,978 | 9/1983 | Huret | 474/82 |
| 4,500,302 | 2/1985 | Crepin | 474/82 |
| 4,610,644 | 9/1986 | Nagano | 474/82 |
| 4,754,853 | 7/1988 | Nagano | 188/24.19 |
| 5,037,355 | 8/1991 | Kobayashi | 474/82 |
| 5,058,450 | 10/1991 | Yoshigai | 74/502.2 |

FOREIGN PATENT DOCUMENTS

| | | | |
|---|---|---|---|
| 637299 | 12/1963 | Belgium | B62M 9/12 |
| 020092 | 12/1980 | European Pat. Off. | B62M 9/12 |
| 0432268 | 6/1991 | European Pat. Off. | |
| 0554909 | 8/1993 | European Pat. Off. | |
| 1041326 | 8/1953 | France | B62M 9/12 |
| 47-27656 | 7/1972 | Japan . | |
| 50-67558 | 10/1975 | Japan . | |
| 616877 | 4/1946 | United Kingdom | B62M 9/12 |

*Primary Examiner*—Roger J. Schoeppel
*Attorney, Agent, or Firm*—James A. Deland

[57] ABSTRACT

A rear derailleur for a bicycle having a bracket connected to a bicycle frame, a guide wheel for shifting a chain, a support member for supporting the guide wheel, a base member pivotably attached to the bracket, a tension spring for biasing the base member in a predetermined pivoting direction, and a parallelogram link mechanism for linking the support member and the base member. The bracket has a mounting section formed in a region thereof adjacent the bicycle frame and opposed to the bicycle frame. The tension spring is attached to the mounting section so as to lie between the bicycle frame and the mounting section. The tension spring is a coil spring having one end thereof fixed to the mounting section, and the other end fixed to the base member. An axis extends through a middle tubular space of the coil spring for pivotally connecting the base member to the bracket. The link mechanism includes an inner pivotal link, and an outer pivotal link disposed farther from the bicycle frame than the inner pivotal link is. The inner pivotal link is connected at one end thereof to the base member by a first pivot pin. The first pivot pin is disposed closer to the bicycle frame than the mounting section is.

17 Claims, 5 Drawing Sheets

F I G. 3
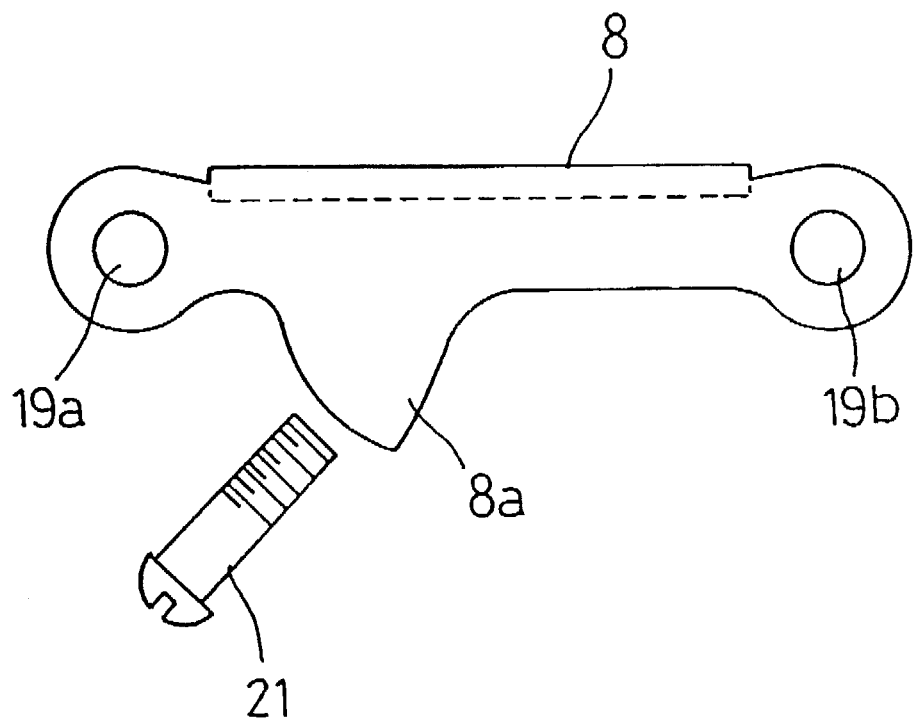

5,624,335

REAR DERAILLEUR FOR A BICYCLE

This is a continuation of application Ser. No. 08/334,591, filed Nov. 3, 1994, now abandoned.

BACKGROUND OF THE INVENTION

1. Field of the Invention

The present invention relates to a rear derailleur for a bicycle having a bracket connected to a bicycle frame, a guide wheel for shifting a chain, a support member for supporting the guide wheel, a base member pivotably attached to the bracket, a tension spring for biasing the base member in a predetermined pivoting direction, and a linkage device for linking the support member and base member.

2. Description of the Related Art

In a rear derailleur for a bicycle of the type noted above, as disclosed in Japanese Patent Publication No. 47-27656, for example, the tension spring is disposed outwardly of the bracket, that is to say the tension spring is attached, in a posture extending transversely of the bicycle, to a mounting section formed on a side of the bracket facing away from the bicycle frame. Consequently, the bracket lies between the tension spring and bicycle frame.

In the construction noted above in which the tension spring is disposed outside the bracket with respect to the bicycle frame, the end of the tension spring disposed inwardly is engaged with the bracket, while the end of the tension spring disposed outwardly is engaged with the base member. It is necessary for the base member to include a section opposed to the bracket across the tension spring for engaging the tension spring. Conventionally, therefore, where the base member and bracket are connected, the base member projects to a relatively large extent outwardly from the bracket in the transverse direction of the bicycle.

SUMMARY OF THE INVENTION

The object of the present invention is to provide a compact rear derailleur for a bicycle, which has a construction to reduce the above-noted lateral projection of the base member.

The above object is fulfilled, according to the present invention, by a rear derailleur in which the bracket fixed to a bicycle frame has a mounting section formed in a region thereof adjacent the bicycle frame and opposed to the bicycle frame, and a tension spring is attached to the mounting section so as to lie between the bicycle frame and the mounting section.

With this construction, the tension spring does not project outside the bracket transversely of the bicycle frame. Consequently, this construction avoids part of the base member projecting to a large extent outside the bracket transversely of the bicycle frame. With the tension spring disposed inwardly of the bracket, the entire rear derailleur has a compact construction and presents an excellent outward appearance.

To enhance compactness of the rear derailleur, the tension spring may be a coil spring having one end thereof fixed to the mounting section, and the other end fixed to the base member, the coil spring receiving an axis extending through a middle tubular space thereof for pivotally connecting the base member to the bracket.

In a preferred embodiment of the invention, the linkage device includes an inner pivotal link, and an outer pivotal link disposed farther from the bicycle frame than the inner pivotal link is, to form a parallelogram link mechanism with the support member and the base member, the inner pivotal link being connected at one end thereof to the base member by a first pivot pin, and at the other end to the support member by a second pivot pin, the outer pivotal link being connected at one end thereof to the base member by a third pivot pin, and at the other end to the support member by a fourth pivot pin, the first pivot pin being disposed closer to the bicycle frame than the mounting section is. According to this construction, the derailleur is in neutral position when the inner pivotal link extends straight forward from the first pivot pin longitudinally of the bicycle. The inner pivotal link is pivotable inward from this neutral position to provide one range of shifting stroke, and outward to provide the other range of shifting stroke. In the conventional derailleur, the first pivot pin interconnecting the inner pivotal link and base member is disposed more outwardly than the bracket, and the chain is shiftable among a plurality of rear gears only by the inner pivotal link pivoting outward from the neutral position. Compared with the prior art, the present invention secures necessary strokes for the guide wheel to shift the chain among all of the rear gears while shortening the inner and outer pivotal links. This contributes to compactness of the derailleur.

In a further preferred embodiment of the invention, the bracket includes a first adjusting screw and a second adjusting screw arranged between the first pivot pin and the third pivot pin, the first adjusting screw being for use in adjusting a limit to pivotal movement of the inner pivotal link relative to the base member, the second adjusting screw being for use in adjusting a limit to pivotal movement of the outer pivotal link relative to the base member. With this construction, the adjusting screws are accessible longitudinally of the bicycle frame, without being obstructed by the bracket. The operator may take an easy and comfortable posture when effecting an adjusting operation.

Other features and advantages of the invention will be apparent from the following description of the preferred embodiments to be taken in conjunction with the accompanying drawings.

BRIEF DESCRIPTION OF THE DRAWINGS

FIG. 3 is an explanatory view showing a relationship between an inner pivot link and an adjusting screw.

DETAILED DESCRIPTION OF THE PREFERRED EMBODIMENTS

Figure 1:
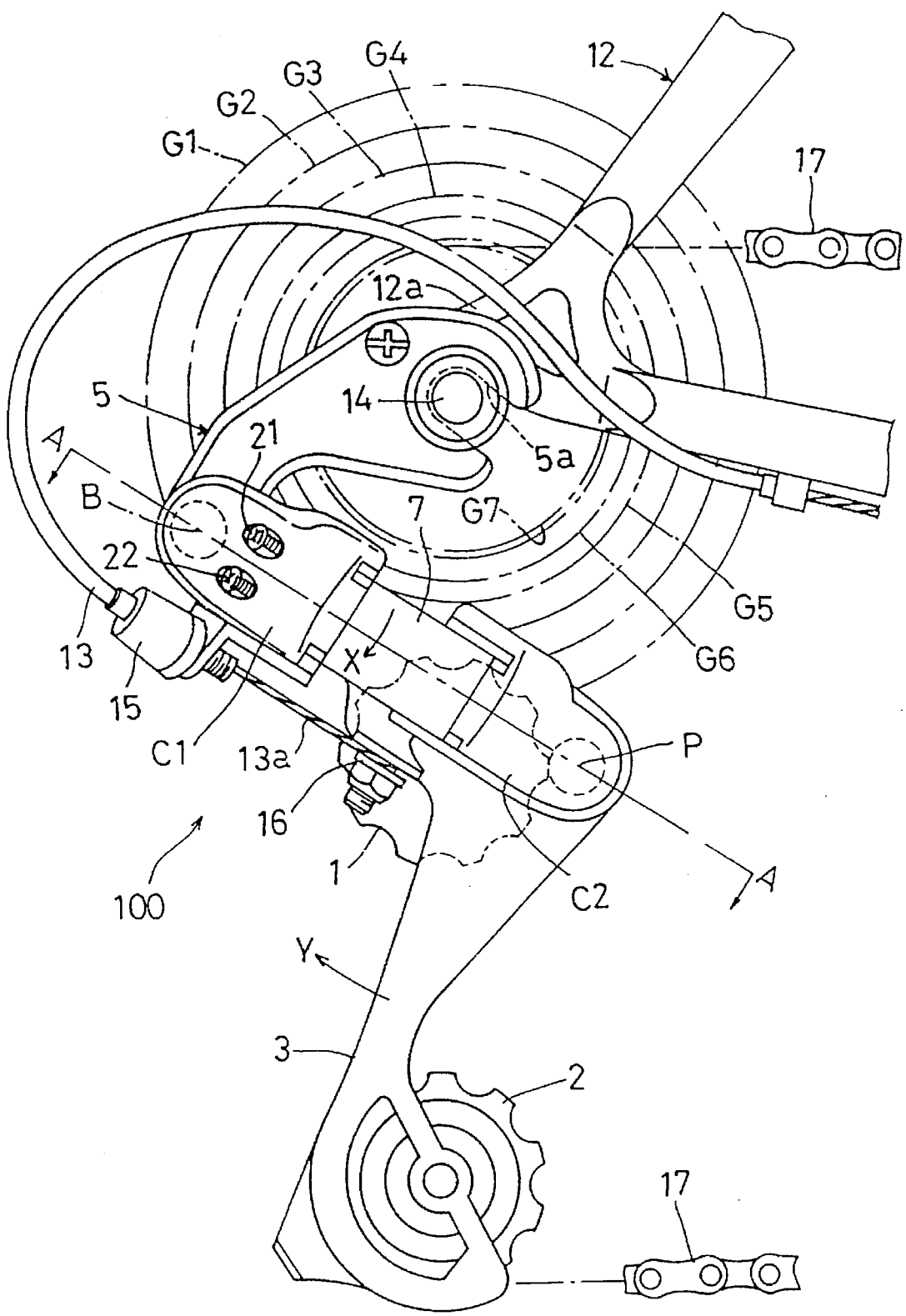
FIG. 1 is an overall side view of a rear derailleur for a bicycle according to the present invention.
Figure 2:
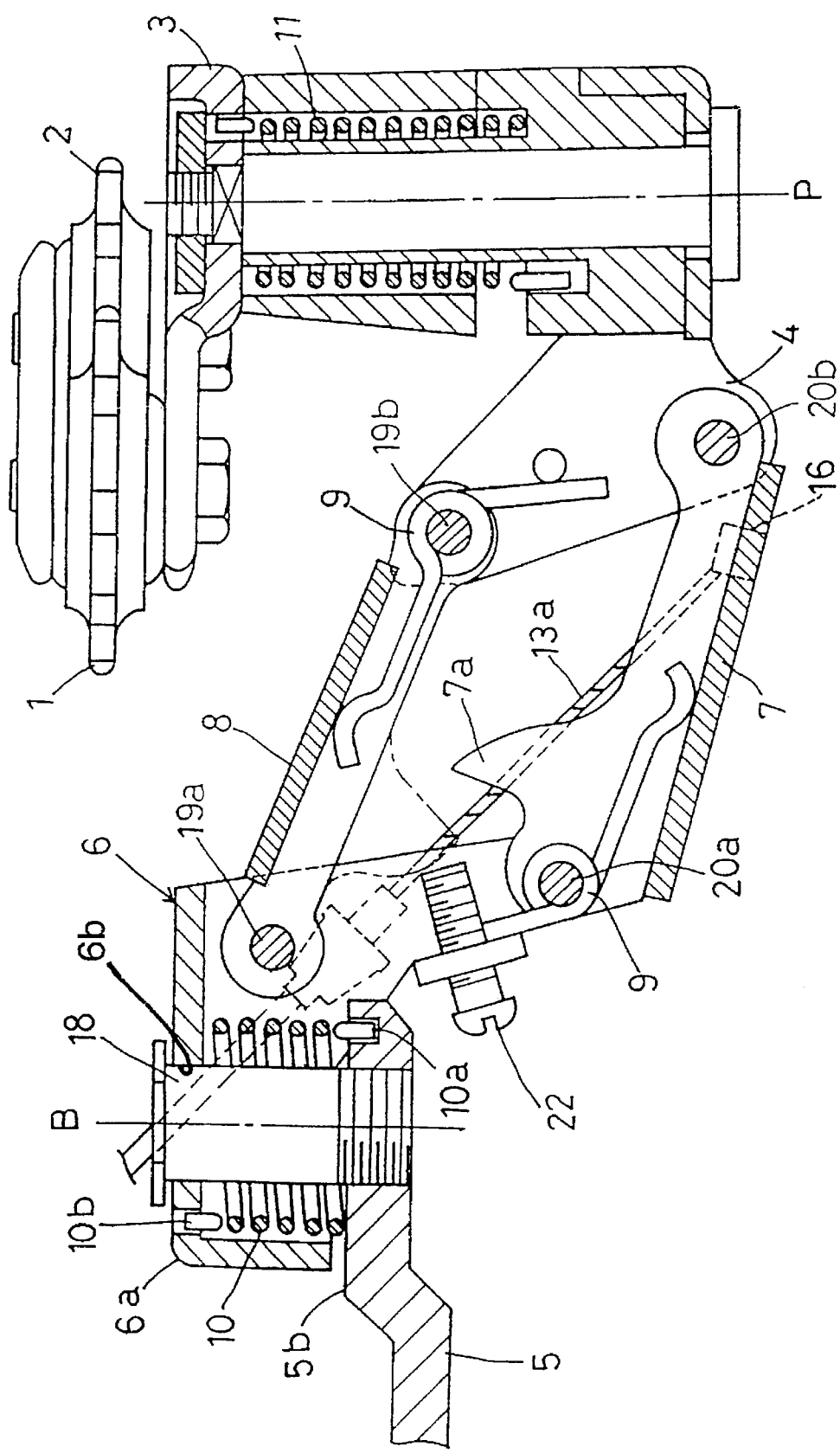
FIG. 2 is a section taken on line A—A of FIG. 1.

As shown in FIGS. 1 and 2, a rear derailleur 100 according to the present invention includes a guide plate 3 having a guide wheel 1 and a tension wheel 2, and a support member 4 connected to the guide plate 3 to be pivotable about an axis P. Further, this rear derailleur 100 includes a bracket 5 formed of sheet metal and fixed to a bicycle frame 12, and a base member 6 connected to the bracket 5 through a pivot member 18 to be pivotable about an axis B. Base member 6 includes a contact surface 6b which slidingly contacts the outer peripheral surface of pivot member 18. The base member 6 and support member 4 are interconnected through an outer pivotal link 7 and an inner pivotal link 8 to be displaceable relative to each other. As seen from FIG. 2, the base member 6, support member 4, outer pivotal link 7 and inner pivotal link 8 constitute a parallelogram link mechanism. The inner pivotal link 8 has one end thereof connected to the base member 6 by a first pivot pin 19a, and the other end connected to the support member 4 by a second pivot pin 19b. The outer pivotal link 7 has one end thereof connected to the base member 6 by a third pivot pin 20a, and the other end connected to the support member 4 by a fourth pivot pin 20b. The outer pivotal link 7 and base member 6 have a return spring 9 provided therebetween, while the inner pivotal link 8 and support member 4 also have a return spring 9 therebetween. Further, a first tension spring 10 is mounted between the bracket 5 and base member 6, and a second tension spring 11 between the support member 4 and guide plate 3. The base member 6 has a pair of adjusting screws 21 and 22, and a removable first cap C1 for covering the adjusting screws 21 and 22. The support member 4 has a second cap C2 for covering the support member 4 and an outer end portion of the bicycle. This rear derailleur 100 is operable by a control cable 13 extending from a shift lever device (not shown).

The bracket 5 has a cutout mounting bore 5a formed in an end thereof remote from the base member 6. This mounting bore 5a is shaped to receive a rear wheel hub spindle 14. With this construction, the end of the bracket 5 may enter and be held between a rear fork end 12a of the bicycle frame 12 and a clamp (not shown) mounted on the rear wheel hub spindle 14. That is, the bracket 5 with the mounting bore 5a is tightened along with the hub spindle 14 to the rear fork end 12a, thereby to be fixed to the bicycle frame 12. By tightening the bracket 5 to the rear fork end 12a as above, the rear derailleur 100 is attached to the bicycle frame 12.

In the attached state, the bicycle frame 12 supports the base member 6 through the bracket 5, and the base member 6 supports the support member 4 through the outer pivotal link 7 and inner pivotal link 8. Consequently, the guide wheel 1 is supported by the bicycle frame 12 to be capable of parallel movement in transverse directions. The control cable 13 has an outer tube connected at an end thereof to an outer tube holder 15 attached to the base member 6, and an inner wire 13a connected to a wire coupling 16 attached to the pivotal link 7, whereby the parallelogram link mechanism is operable by the inner wire 13a. Consequently, the guide wheel 1 is movable relative to rear gears G1–G7 to effect a shifting operation. Specifically, when the inner wire 13a is pulled, its pulling force causes the support member 4 to move inwardly of the bicycle relative to the base member 6. This causes the guide wheel 1 to move inwardly relative to the bicycle frame 12 and change a chain 17 from a smaller one to a larger one of rear wheel driving gears G1–G7. When the inner wire 13a is relaxed, the support member 4 moves outwardly of the bicycle relative to the base member 6 under the elastic restoring force of the return springs 9. As a result, the guide wheel 1 moves outwardly relative to the bicycle frame 12 and changes the chain 17 from a larger one to a smaller one of the rear wheel driving gears G1–G7.

As shown in FIG. 2, the first tension spring 10 is a coil spring mounted on the pivot member fastener 18 rotatably interconnecting the bracket 5 and base member 6. The bracket 5 has a spring mounting section 5b formed on a surface opposed to the base member 6. The first tension spring 10 is disposed inside a skirt 6a extending from an end of the base member 6. One end 10a of the first tension spring 10 is engaged with the spring mounting section 5b of the bracket 5, while the other end 10b thereof is engaged with the base member 6. Thus, the first tension spring 10 is disposed inside the skirt 6a inwardly of the bicycle with respect to the bracket 5. An extent to which the portion of the base member 6 connected to the bracket 5 projects outwardly is minimized. The skirt 6a of the base member 6 provided to connect the base member 6 to the bracket 5 acts as a case for protecting the first tension spring 10. The first tension spring 10 biases the base member 6 to pivot in X direction shown in FIG. 1, relative to the bracket 5 or bicycle frame 12. Consequently, the support member 4 is biased in X direction about the axis B, to tighten the chain 17 through the guide wheel 1 and tension wheel 2. The second tension spring 11 is mounted inside a portion of the support member 4 pivotally supporting the guide plate 3. The second tension spring 11 biases the guide plate 3 to pivot in Y direction shown in FIG. 1, about the axis P relative to the support member 4. Consequently, the guide wheel 1 and tension wheel 2 are biased in Y direction about the axis P to tighten the chain 17. Thus, whichever of the rear gears G1–G7 having different diameters is engaged with the chain 17, the first tension spring 10 and second tension spring 11 place the chain 17 in a tight state necessary to drive the rear gears G1–G7. For all this, the positional relationship of the first tension spring 10 to the bracket 5 diminishes the extent to which the portion of the base member 6 connected to the bracket 5 projects outwardly, to render the entire derailleur compact.

As shown in FIG. 2, the inner pivotal link 8 is pivotally attached to the base member 6 through the first pivot pin 19a disposed more inwardly of the bicycle than the inward surface 5b of the bracket 5. The outer pivotal link 7 is pivotally attached to the base member 6 through the third pivot pin 20a disposed more outwardly of the bicycle than the bracket 5. The pair of adjusting screws 21 and 22 are attached to the base member 6 between the pivot pins 19a and 20a. Because of the position of section line A—A in FIG. 1, FIG. 2 does not show the adjusting screw 21 or a screw stopper 8a formed on the inner pivotal link 8. FIG. 3 shows the adjusting screw 21 and screw stopper 8a as extracted from the rest. To facilitate understanding, only the screw stopper 8a is shown in a dot-and-dash line in FIG. 2. The adjusting screw 21 is disposed such that, as the inner pivotal link 8 pivots outwardly relative to the base member 6, the forward end of the adjusting screw 21 moves into contact with the screw stopper 8a of the pivotal link 8, thereby setting a limit to the pivotal movement of the pivotal link 8. When this adjusting screw 21 is turned, a position of contact between the adjusting screw 21 and screw stopper 8a is shifted to vary the limit to the pivotal movement of the pivotal link 8. Thus, the adjusting screw 21 sets a limit to outward pivotal movement of the support member 4 relative to the base member 6, while allowing adjustment of the limit to the pivotal movement. The other adjusting screw 22 is disposed such that, as the outer pivotal link 7 pivots inwardly relative to the base member 6, the forward end of the adjusting screw 22 moves into contact with a screw stopper 7a formed on the pivotal link 7, thereby setting a limit to the pivotal movement of the pivotal link 7. When this adjusting screw 22 is turned, a position of contact between the adjusting screw 22 and screw stopper 7a is shifted to vary the limit to the pivotal movement of the pivotal link 7. Thus, the adjusting screw 22 sets a limit to inward pivotal movement of the support member 4 relative to the base member 6, while allowing adjustment of the limit to the pivotal movement. That is, the adjustment of the limits to the pivotal movement of the pivotal links 7 and 8 made by turning the adjusting screws 21 and 22 adjusts a stroke of transverse movement of the support member 4 relative to the base member 6 caused by operations to pull and relax the control cable 13, a stroke end of the inward movement of the support member 4, and a stroke end of the outward movement of the support member 4. Further, this adjustment assures that the guide wheel 1 moves to a predetermined position in time of a shifting operation, thereby to shift the chain 17 to any one of the rear gears G1–G7 properly. This adjustment may be effected relatively easily since the adjusting screws 21 and 22 are disposed between the pivot pins 19 and 20 to facilitate access.

Figure 4A:
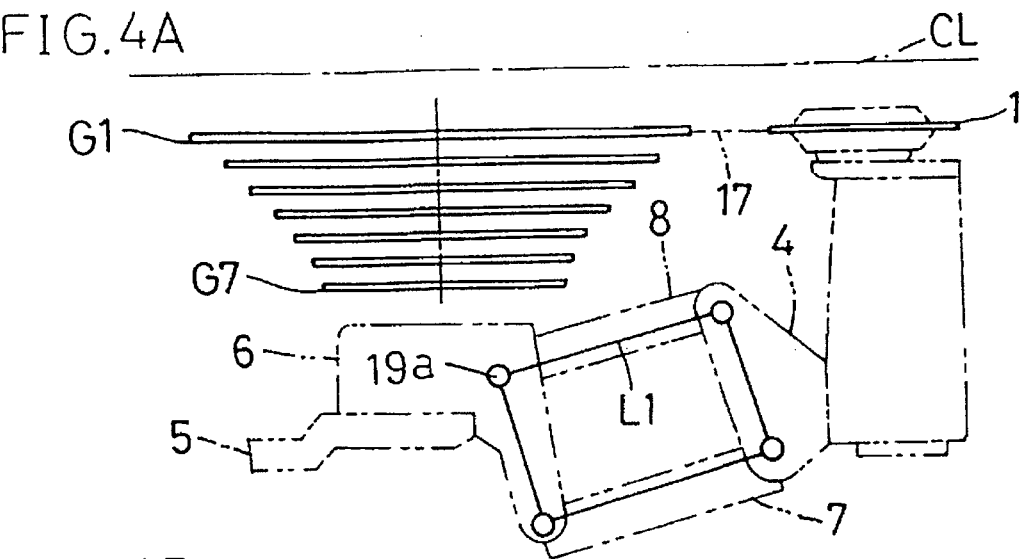
FIGS. 4A, 4B and 4C are explanatory views showing operative states of a parallelogram link mechanism of the rear derailleur.
Figure 4B:
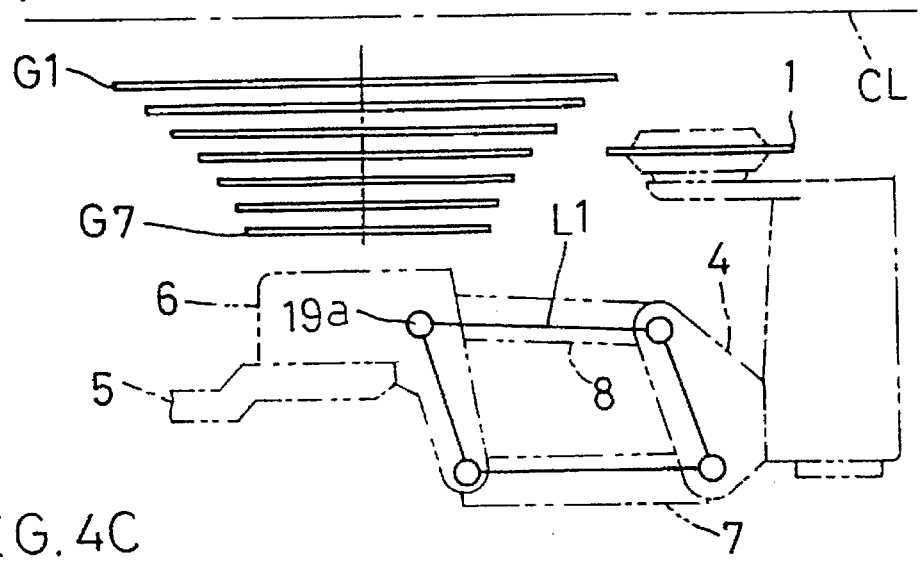
Figure 4C:
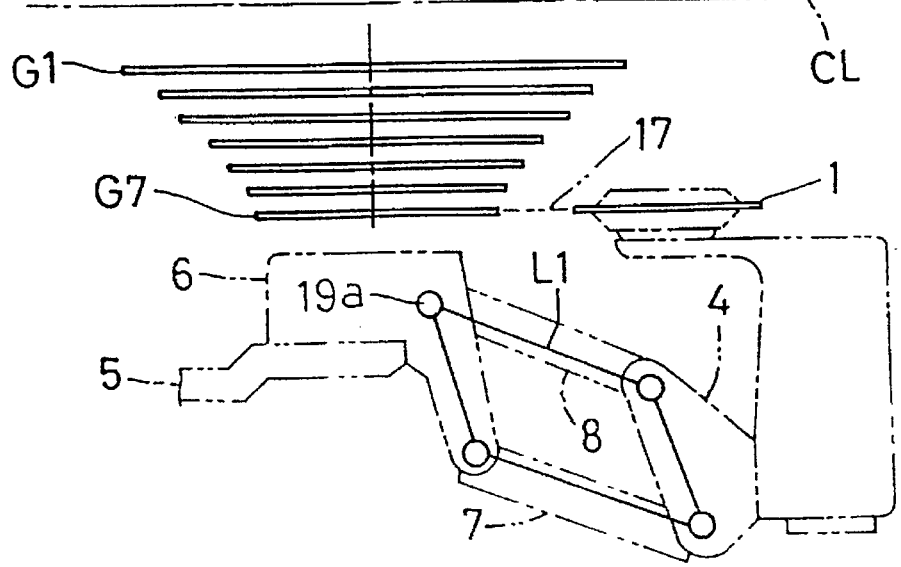

The first pivot pin 19a connecting the inner pivotal link 8 and base member 6 is disposed more inwardly of the bicycle than the mounting section 5b of the bracket 5 as described hereinbefore. Consequently, as shown in FIGS. 4A, 4B and 4C, the guide wheel 1 lies between the largest, innermost rear gear G1 and the smallest, outermost rear gear G7 when the inner pivotal link 8 extends straight forward, i.e. when a straight line L1 passing through the pivotal axis connecting the pivotal link 8 to the base member 6 and the pivotal axis connecting the pivotal link 8 to the support member 4 extends parallel to a centerline CL of the bicycle. When shifting operations are carried out in this state, the parallelogram link mechanism operates as shown in FIGS. 4A–4C, to shift the chain 17 among the rear gears G1–G7. Specifically, when a shifting operation is effected to provide the lowest speed with the chain 17 engaging the largest gear G1, the inner pivotal link 8 extends from the base member 6 inwardly as shown in FIG. 4A, compared with the straight forward posture. When a shifting operation is effected to provide the highest speed with the chain 17 engaging the smallest gear G7, the inner pivotal link 8 extends from the base member 6 outwardly as shown in FIG. 4C, again compared with the straight forward posture. Thus, the pivotal link 8 pivots across the straight forward posture so that the guide wheel 1 has a large stroke of transverse movement in proportion to angle of pivotal movement of the pivotal links 7 and 8. As a result, a relatively small moving stroke of the inner wire 13a causes the guide wheel 1 to move through a predetermined stroke, although the pivotal links 7 and 8 are relatively short and compact, thereby to shift the chain 17 among the rear gears G1–G7.

[Other Embodiment]

Figure 5:
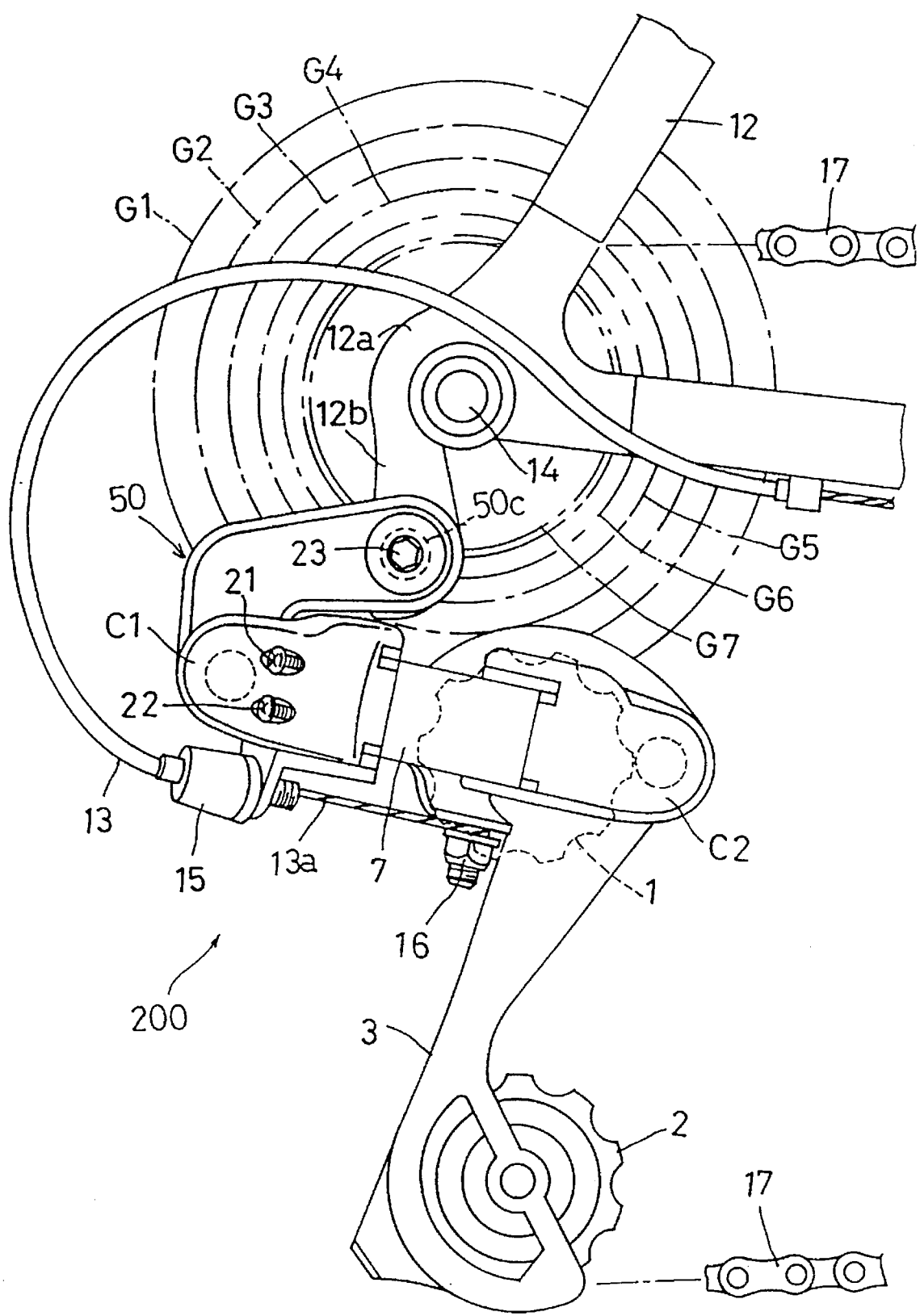
FIG. 5 is an overall side view of a rear derailleur for a bicycle in a different embodiment of the invention.

FIG. 5 shows a rear derailleur 200 for a bicycle in a different embodiment of the invention, in which only the bracket 50 has a different construction to what is shown in FIG. 1.

In this embodiment, the bracket 50 has a perforated mounting bore 50c in the end thereof remote from the base member 6. The mounting bore 50c receives a mounting screw 23 for tightening the bracket 50 to a derailleur mounting extension 12b of the rear fork end 12a of the bicycle frame 12. That is, by tightening the bracket 50 with the mounting bore 50c to the derailleur mounting extension 12b, the rear derailleur 200 is attached to the bicycle frame 12.

What is claimed is:

1. A rear derailleur for a bicycle comprising:

a bracket for connecting at one end thereof to a bicycle frame, said bracket having a mounting section with a mounting surface facing a rear wheel of said bicycle;

a guide wheel for shifting a chain;

a support member for supporting said guide wheel;

a pivot member supported to said bracket and extending along a pivot axis;

a base member pivotably attached to said mounting surface through said pivot member and extending toward said rear wheel, said base member having a contact surface that contacts said pivot member, said contact surface being located between said bracket and said rear wheel;

a first tension spring for biasing said base member in a predetermined pivoting direction, said first tension spring extending from said mounting surface toward said rear wheel;

linkage means for linking said support member and said base member;

wherein said linkage means includes an inner pivotal link and an outer pivotal link disposed farther from said rear wheel than said inner pivotal link to form a four-bar link mechanism with said support member and said base member, said inner pivotal link being connected at one end thereof to said base member by a first pivot pin, and at the other end to said support member by a second pivot pin, said outer pivotal link being connected at one end thereof to said base member by a third pivot pin, and at the other end to said support member by a fourth pivot pin; and wherein said base member defines bores for receiving said first pivot pin and said third pivot pin, such that portions of said mounting surface adjacent to said base member are aligned between said first pivot pin and said third pivot pin transversely of the bicycle.

2. A rear derailleur as defined in claim 1 wherein said tension spring is a coil spring having one end thereof fixed to said mounting section, and the other end fixed to said base member, said coil spring receiving an axis extending through a middle tubular space thereof for pivotally connecting said base member to said bracket.

3. A rear derailleur as defined in claim 2, wherein said base member defines a skirt extending toward said mounting surface of said bracket, at least a portion of said tension spring being disposed in said skirt.

4. A rear derailleur as defined in claim 3, wherein said bracket defines a mounting bore for use in fixing said bracket along with a hub spindle to a rear fork end of said bicycle frame.

5. A rear derailleur as defined in claim 3, wherein said bracket defines a mounting bore for use in fixing said bracket to a derailleur mounting extension formed on a rear fork end of said bicycle frame.

6. A rear derailleur as defined in claim 1, wherein said bracket includes an adjusting screw arranged between said first pivot pin and said third pivot pin, said adjusting screw being for use in adjusting a limit to pivotal movement of said outer pivotal link relative to said base member.

7. The rear derailleur as defined in claim 1 further comprising:

a guide plate pivotally coupled to said support member for supporting said guide wheel;

a second tension spring for biasing said guide plate in a predetermined pivoting direction;

a first return spring disposed about said second pivot pin and contacting said inner pivotal link and said support member for biasing said support member away from said rear wheel; and a second return spring disposed about said third pivot pin and contacting said outer pivotal link and said base member for biasing said support member away from said rear wheel.

8. A rear derailleur as defined in claim 1, wherein all portions of said base member that overlap with said bracket in a view along said pivot axis are located between said bracket and said rear wheel.

9. A rear derailleur for attaching to a mounting section of a bracket affixed to a bicycle frame, the mounting section having a mounting surface facing a rear wheel of the bicycle, the rear derailleur comprising:

a guide wheel for shifting a chain;

a support member for supporting said guide wheel;

a pivot member supported to said bracket and extending along a pivot axis;

a base member for pivotably attaching to said mounting surface through said pivot member and extending toward a rear wheel of said bicycle, said base member having a contact surface that contacts said pivot member, said contact surface being located between said bracket and said rear wheel;

a first tension spring for biasing said base member in a predetermined pivoting direction, said first tension spring extending toward said rear wheel;

linkage means for linking said support member and said base member;

wherein said linkage means includes an inner pivotal link and an outer pivotal link disposed farther from said rear wheel than said inner pivotal link to form a four-bar link mechanism with said support member and said base member, said inner pivotal link being connected at one end thereof to said base member by a first pivot pin, and at the other end to said support member by a second pivot pin, said outer pivotal link being connected at one end thereof to said base member by a third pivot pin, and at the other end to said support member by a fourth pivot pin; and wherein said base member is structured such that said mounting surface of said bracket is aligned between said first pivot pin and said third pivot pin transversely of the bicycle when said base member is mounted to said mounting section.

10. A rear derailleur as defined in claim 9, wherein said tension spring is a coil spring having one end thereof fixed to said mounting section and the other end fixed to said base member, said coil spring receiving a fastener extending through a middle tubular space thereof for pivotally connecting said base member to said bracket.

11. A rear derailleur as defined in claim 9, wherein said base member defines a skirt extending toward said mounting surface, said tension spring being disposed in said skirt.

12. The rear derailleur as defined in claim 9 further comprising:

a guide plate pivotally coupled to said support member for supporting said guide wheel;

a second tension spring for biasing said guide plate in a predetermined pivoting direction;

a first return spring disposed about said second pivot pin and contacting said inner pivotal link and said support member for biasing said support member away from said rear wheel; and a second return spring disposed about said third pivot pin and contacting said outer pivotal link and said base member for biasing said support member away from said rear wheel.

13. A rear derailleur as defined in claim 9, wherein said base member includes a first adjusting screw and a second adjusting screw arranged between said first pivot pin and said third pivot pin, said first adjusting screw being for use in adjusting a limit to pivotal movement of said inner pivotal link relative to said base member, said second adjusting screw being for use in adjusting a limit to pivotal movement of said outer pivotal link relative to said base member.

14. A rear derailleur for a bicycle comprising:

a bracket for connecting at one end thereof to a bicycle frame, said bracket having a mounting section with a mounting surface facing a rear wheel of said bicycle;

a guide wheel for shifting a chain;

a support member for supporting said guide wheel;

a pivot member extending coaxially along a pivot axis from said mounting section of said bracket;

a base member pivotably attached to said mounting section through said pivot member and extending toward said rear wheel so that all portions of said base member that overlaps with said bracket in a view along said pivot axis are located between said bracket and said rear wheel;

a first tension spring for biasing said base member in a predetermined pivoting direction, said first tension spring extending from said mounting surface toward said rear wheel;

linkage means for linking said support member and said base member; and wherein said linkage means includes an inner pivotal link and an outer pivotal link disposed farther from said rear wheel than said inner pivotal link to form a four-bar link mechanism with said support member and said base member, said inner pivotal link being connected at one end thereof to said base member by a first pivot pin, and at the other end to said support member by a second pivot pin, said outer pivotal link being connected at one end thereof to said base member by a third pivot pin, and at the other end to said support member by a fourth pivot pin.

15. A rear derailleur as defined in claim 14 wherein said pivot member is inserted into said mounting section.

16. A rear derailleur as defined in claim 15 wherein said pivot member comprises a threaded shaft that screws directly into said mounting section.

17. A rear derailleur for a bicycle comprising:

a bracket for connecting at one end thereof to a bicycle frame, said bracket having a mounting section with a mounting surface facing a rear wheel of said bicycle;

a guide wheel for shifting a chain;

a support member for supporting said guide wheel;

a pivot member supported to said bracket and extending along a pivot axis;

a base member pivotably attached to said mounting surface through said pivot member and extending toward said rear wheel, said base member having a contact surface that contacts said pivot member, said contact surface being located between said bracket and said rear wheel;

a first tension spring for biasing said base member in a predetermined pivoting direction, said first tension spring extending from said mounting surface toward said rear wheel;

linkage means for linking said support member and said base member; and wherein said linkage means includes an inner pivotal link and an outer pivotal link disposed farther from said rear wheel than said inner pivotal link to form a four-bar link mechanism with said support member and said base member, said inner pivotal link being connected at one end thereof to said base member by a first pivot pin, and at the other end to said support member by a second pivot pin, said outer pivotal link being connected at one end thereof to said base member by a third pivot pin, and at the other end to said support member by a fourth pivot pin.

* * * * *